March 3, 1964    E. E. SLAUGHTER    3,123,320
VERTICAL RISE AIRCRAFT
Filed Oct. 22, 1962    3 Sheets-Sheet 1
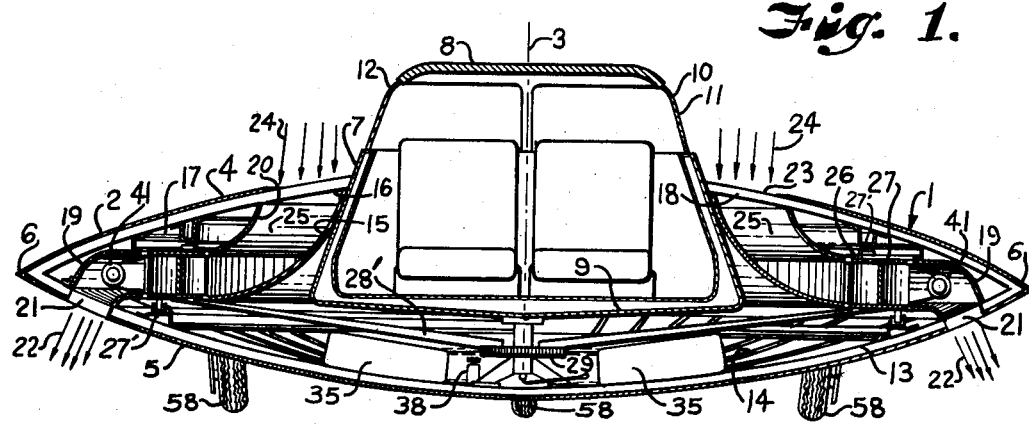
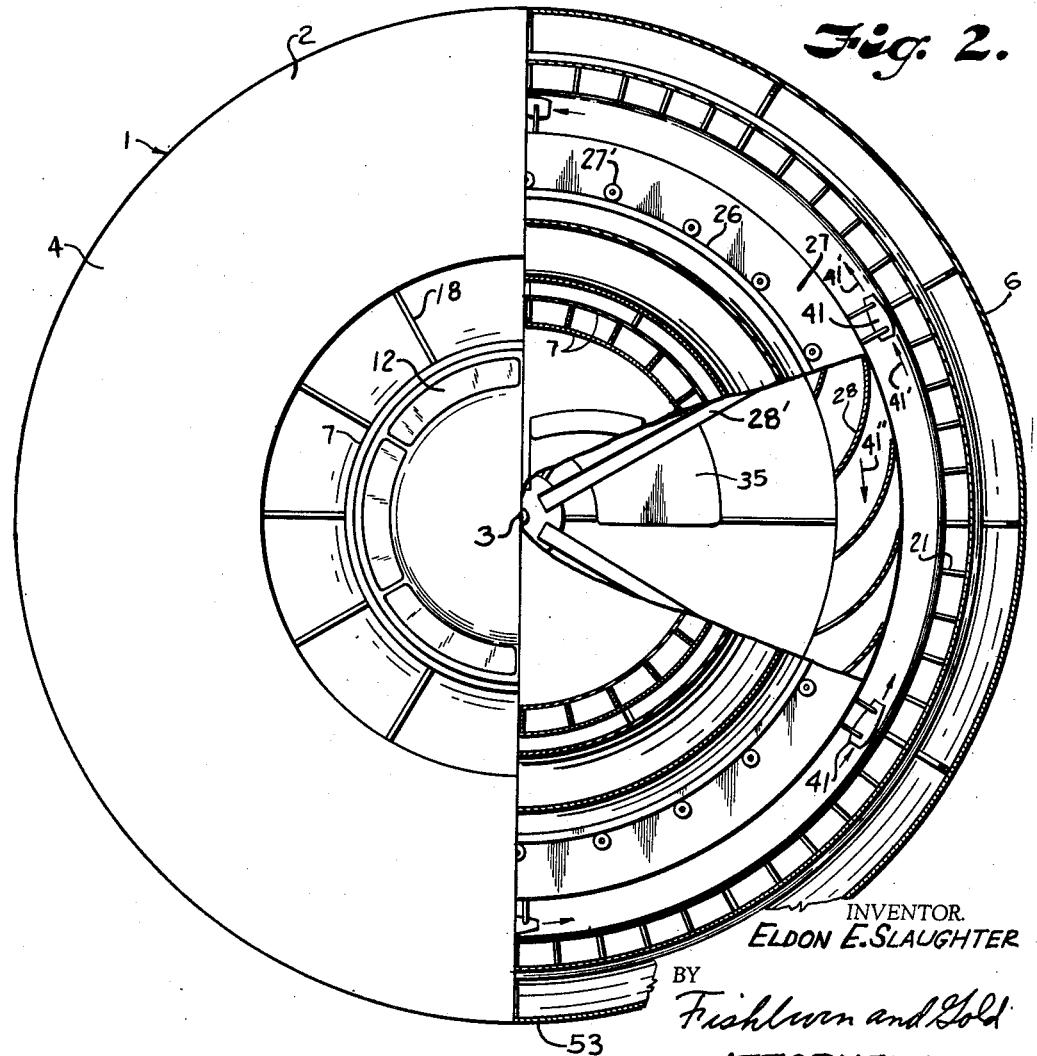
INVENTOR.
ELDON E. SLAUGHTER
BY
Fishburn and Gold
ATTORNEYS

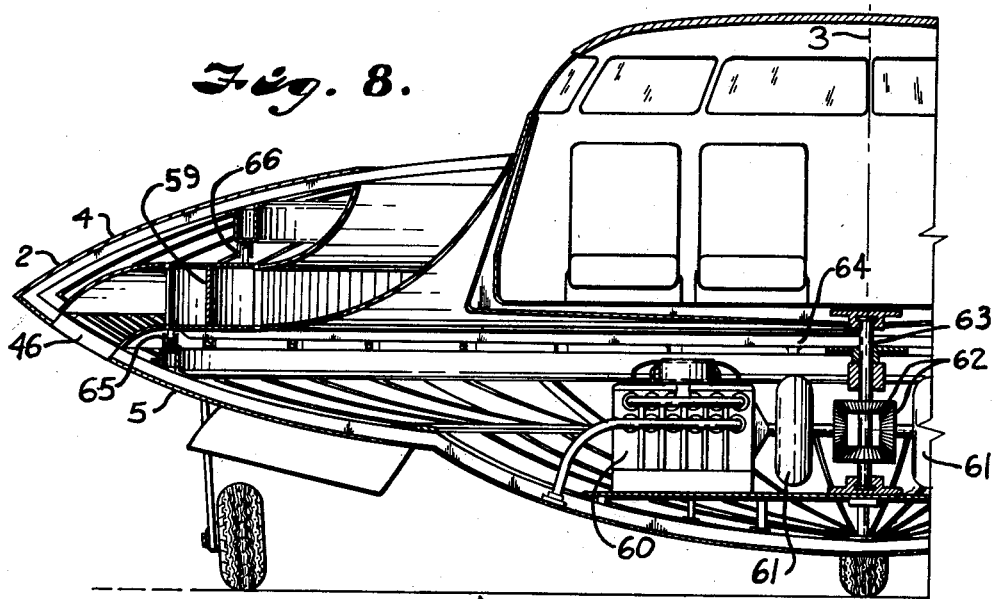
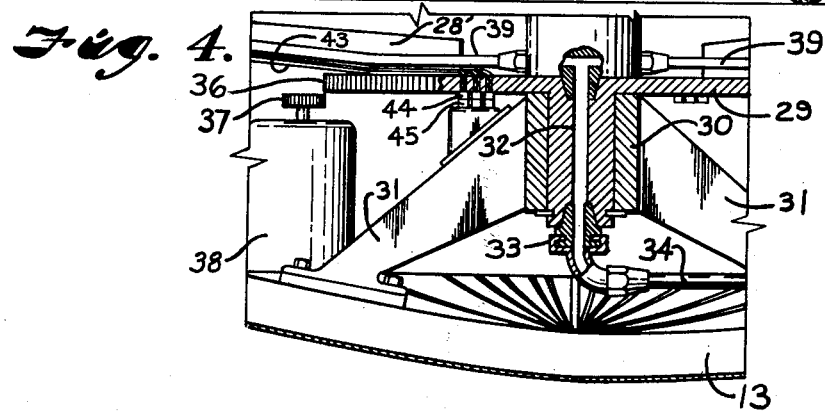
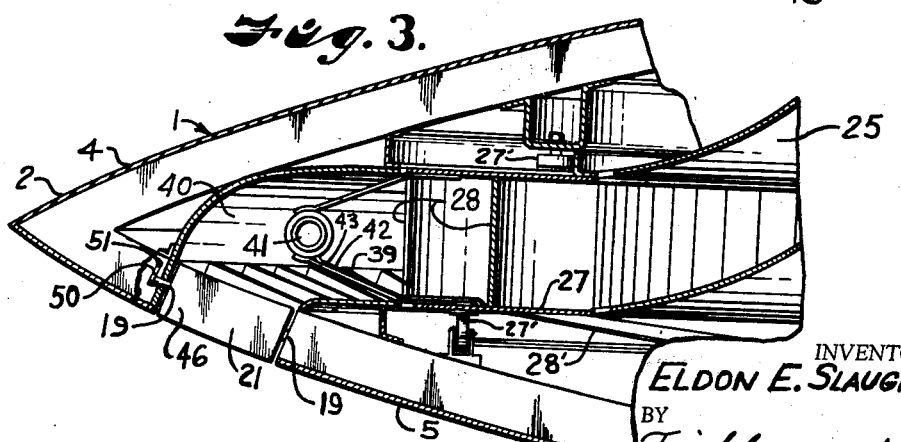
INVENTOR.
ELDON E. SLAUGHTER

March 3, 1964
E. E. SLAUGHTER
3,123,320
VERTICAL RISE AIRCRAFT
Filed Oct. 22, 1962
3 Sheets-Sheet 3
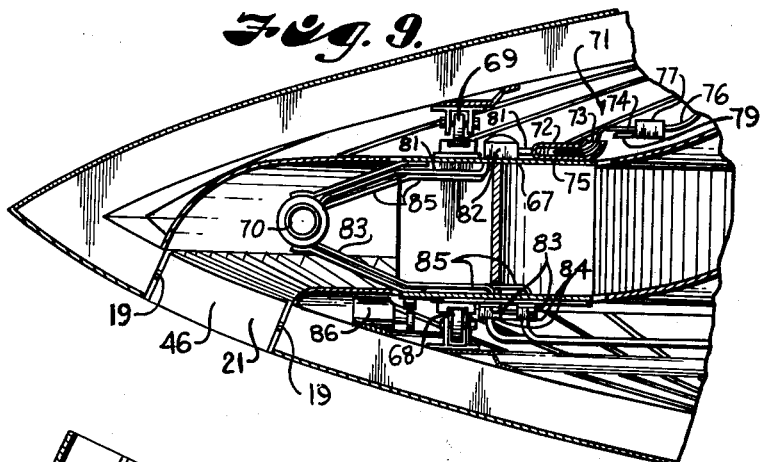
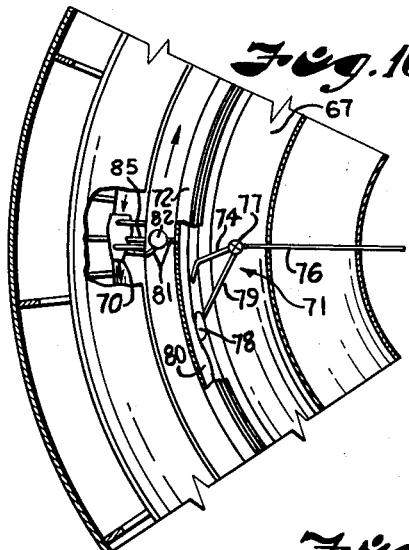
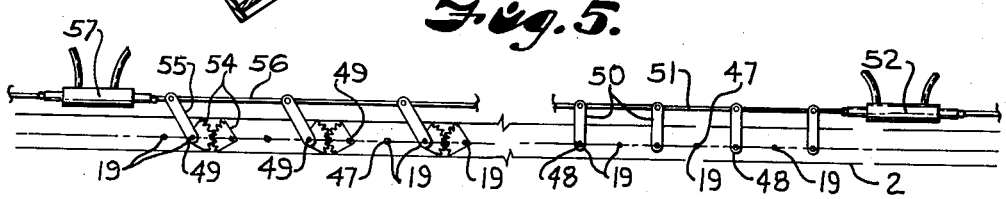
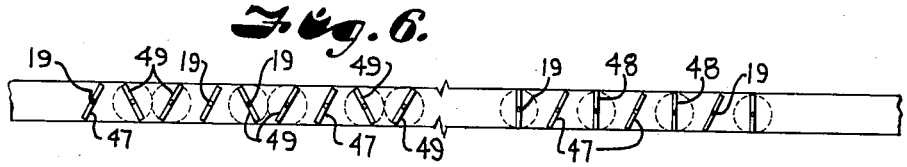
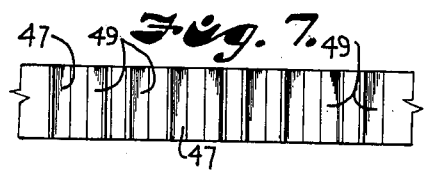
INVENTOR.
ELDON E. SLAUGHTER
BY
Fishburn and Gold
ATTORNEYS

United States Patent Office 3,123,320
Patented Mar. 3, 1964

3,123,320
VERTICAL RISE AIRCRAFT
Eldon E. Slaughter, 1100 Lindberg, Kansas City, Mo.
Filed Oct. 22, 1962, Ser. No. 231,896
6 Claims. (Cl. 244—12)

This invention relates to heavier-than-air aircraft and more particularly to aircraft of the type having an enclosed centrifugal blower which discharges air downwardly from a radial slot substantially surrounding the aircraft for developing an upward thrust.

The principal objects of the present invention are: to provide a disk-like aircraft which is substantially symmetrical about a vertical axis and requires no external movable flow control surfaces; to provide such an aircraft wherein the upper and lower surfaces thereof are substantially convex in shape presenting a bi-convex airfoil for producing a lifting component in lateral flight; to provide such an aircraft having a windowed passenger and control compartment conveniently located centrally thereof and protruding upwardly therefrom; to provide such an aircraft having an annular intake slot adjacent the passenger and control compartment and an annular discharge slot on the lower surface thereof and including a radial passageway between said intake and discharge slots; to provide such an aircraft wherein a centrifugal blower is rotatably mounted therein which blower has circumferentially spaced air slinging blades rotatable in a radial passageway for centrifugally slinging air from an intake slot toward a discharge slot; to provide such an aircraft wherein a pressure ring duct is formed in the passageway between the blower blades and the discharge slot and a plurality of ram-jet engines are mounted for rotation with said duct; to provide such an aircraft having a plurality of vanes mounted in the discharge slot and forming various control sets to produce individual control functions; to provide such an aircraft wherein the centrifugal blower may be driven through a central shaft or in absence of a central shaft, and to provide such an aircraft which is simple in construction, presents a high cargo-to-dead-weight ratio and is adapted to hover with ease though capable of developing high lateral speeds.

Other objects and advantages of this invention will become apparent from the following description taken in connection with the accompanying drawings wherein are set forth by way of illustration and example certain embodiments of this invention.

FIG. 1 is a vertical cross sectional view through an aircraft embodying this invention showing the relationship of parts therewithin.

FIG. 2 is a top view of the aircraft of FIG. 1 with a portion broken away particularly showing a centrifugal blower rotor and a discharge slot.

FIG. 3 is a fragmentary vertical cross sectional view on an enlarged scale particularly showing one of several ram-jet engines fixed to the blower rotor within the aircraft.

FIG. 4 is a fragmentary vertical cross sectional view on an enlarged scale particularly showing structure for feeding fuel to the ram-jet engines.

FIGS. 5, 6 and 7 are schematic representations of control vanes mounted in the annular discharge slot and the angle controlling mechanism therefore.

FIG. 8 is a fragmentary vertical cross sectional view through another embodiment of this invention which has a centrifugal blower rotor driven through a central shaft.

FIG. 9 is a fragmentary vertical cross sectional view through a still further embodiment of this invention wherein the centrifugal blower rotor has no central support.

FIG. 10 is a fragmentary cross sectional top view on a reduced scale of the embodiment of FIG. 9 showing details of the fuel feeding system therefor.

Referring to the drawings in more detail:

The reference numeral 1 generally indicates one form of a heavier-than-air aircraft embodying this invention. The aircraft 1 is comprised of a disk-like structure 2 which is substantially symmetrical about a vertical axis 3. The disk-like structure 2 presents an upper surface 4 and a lower surface 5 which unite at an outer sharp peripheral edge 6. The upper and lower surfaces 4 and 5 are substantially convex in shape whereby a bi-convex airfoil is presented to the atmosphere during lateral motion of the structure 2, which airfoil is adapted to provide a lifting component in the manner of conventional winged aircraft.

Generally conically shaped side walls 7, a top wall 8 and a bottom wall 9 together form a passenger and control compartment 10 located centrally of the structure 2 and protruding upwardly from the center thereof at 11. Suitable windows 12 are located in circumferentially spaced relation on the side walls 7 above the upper surface 4 presenting a substantially unobstructed view in a horizontal direction 360° about the aircraft.

A lower stator construction 13 includes suitable struts 14, material forming the lower surface 5 and an inner curved wall 15. The lower stator construction 13 supports the walls forming the compartment 10. The inner curved wall 15 terminates adjacent to the inner periphery 16 thereof in contact with the compartment side walls 7. An upper stator construction 17 is fixed to and supported on the lower stator construction 13 by means of suitable radial struts 18 and the supporting shafts or members 19 of certain discharge directing vanes described more fully hereinafter. The upper stator construction 17 is maintained spaced generally upwardly and radially outwardly of the lower stator construction 13 and has an inner curved wall 20 spaced outwardly of the lower stator inner curved wall 15.

The separation between the lower stator construction 13 and upper stator construction 17 produces an annular discharge slot 21 therebetween near the outer peripheral edge 6 but spaced downwardly therefrom. The discharge slot 21 interrupts the lower surface 5 for ejecting gases downwardly and conically outwardly from the structure 2 at high velocity as indicated by the arrows at 22. The upper stator construction is spaced radially outwardly from the compartment 10 forming an annular intake slot 23 therebetween at the upper surface 4 and surrounding the compartment 10. It is noted that the radial struts 18 extend across the annular intake slots 23 and the vane supporting members 19 extend across the annular discharge 21. As described more fully below, air is directed into the annular intake slot 23 as shown by the arrows at 24.

A radial passageway 25 is formed between the upper and lower stator constructions bounded by the respective curved inner walls 20 and 15 and the passageway 25 communicates between the intake slot 23 and the discharge slot 21. A centrifugal blower rotor 26 has a frame 27 supporting circumferentially spaced air slinging blades 28 operatively contained within the radial passageway 25. In the embodiment of FIG. 1 the rotor frame 27 rides on bearing rollers 27' and is fixed to radial spokes 28' which extend inwardly of the aircraft structure 2 beneath the compartment 10 and terminate secured to a platform structure 29, FIG. 4.

The platform structure 29 is rotatably mounted on and in suitable bearing members 30 which are supported by legs 31 secured to the lower stator construction 13. The platform structure 29 has a passageway 32 extending upwardly coaxially therewithin and terminating at the lower end thereof in a rotating seal 33. The seal 33 communicates with a fuel line 34 adapted to receive fuel from fuel tanks 35 located below the compartment 10. The fuel in fuel tanks 35 is used for rotating the frame 27 and blades 28 by ram-jet apparatus described below. The platform structure 29 has gear teeth 36 on the outer periphery thereof engageable with a pinion or gear 37 forming part of a suitable starter motor 38 of the type adapted to produce an axial shaft motion prior to turning for engaging with the gear teeth 36 and withdrawing same after starting. The starter motor 38 is used for rotating the rotor to produce starting conditions for the ram-jet apparatus described below. The passageway 32 communicates with suitable individual fuel lines 39 having respective remote controlled valves (not shown) which are secured to and rotate with the radial spokes 28' for carrying fuel to the ram-jet apparatus.

A pressure ring duct 40 is formed in the passageway 25 between the blades 28 and the discharge slot 21. A plurality of suitable ram-jet engines 41 are mounted in circumferentially balanced relation by means of support struts 42 to the frame 27 of the rotor 26 and are spaced radially outwardly thereof within the pressure ring duct 40, FIG. 3. The engines 41 receive and discharge air in the direction indicated by the arrows 41' to drive the blades in the direction indicated by the arrow 41". The fuel lines 39 travel from the spokes 28' along selected support struts 42 for feeding fuel into the respective ram-jet engines 41. Also traveling along spokes 28' and selected support struts 42 are electrical ignition and control wires 43 for the ram-jet engines 41. The ignition and control wires 43 connect to slip rings 44 which are contacted by suitable brushes 45 for transmitting control signals from the compartment 10 to the moving ram-jet engines 41.

A plurality of circumferentially spaced radially extending vanes broadly designated 46 are mounted between the upper and lower stator constructions 17 and 13 in the discharge slot 21 on the supporting shafts or members 19. The vanes 46, although identical in external appearance are distributed in three vane sets designated 47, 48 and 49, the sets being diagrammatically or schematically illustrated in FIGS. 5, 6 and 7. The vanes in the group or set designated 47 are parallel to each other and substantially fixed at a small angle with respect to the discharge slot 21 for deflecting discharged air and exhaust gas in a somewhat circumferential direction for producing a torque on the structure 2 equal and opposite to the net resultant torque transferred by bearing friction, gas flow forces and other forces between the rotor 26 and the structure 2.

The second set 48 of vanes 46 are maintained parallel to each other but variable in angle with respect to discharge slots 21 to produce in-flight turning of the aircraft on the vertical central axis 3 thereof. The vanes of the set 48 may be interspersed between other vanes. Structure for producing control of the set 48 is illustrated in FIG. 5 wherein lever arms 50 are pivotally mounted on the aircraft structure 2 but fixed to the respective vanes in the set 48, the lever arms 50 being parallel and connected with a common control rod or cable 51 which anchors to a suitable linear motion hydraulic control 52 adapted to axially pull the lever arm 50 to a suitable angle by controls (not shown) located within the compartment 10.

The third set 49 of the vanes 46 are located in adjacent pairs which may be interspersed with other vanes like the vanes in sets 47 and 48. The vanes in the set 49 are controllable for slanting in opposite direction with respect to each other in the respective pairs to selectively restrict gas flow therepast without introducing a separate torque reaction on the aircraft about the vertical axis 3. The various pairs of vanes in the set 49 are operable to cause banking and tilting of the aircraft and also to severely restrict or strangle flow from the forward portion 53 of the aircraft to produce a lateral force component for increasing the atmospheric speed of the aircraft which in turn induces airflow and lift on the airfoil surface 4. The vanes 46 in the set 49 are maintained in opposite angular relation with respect to each other by means of mating segment gears 54 respectively fixed to each member of a pair of vanes in the set. A suitable lever arm 55 is fixed to one of the vanes of the pair and terminates in one of several control rods 56. The control rods 56 may be axially moved by suitable hydraulic controls 57 signalled from the compartment 10 to produce closure or opening of the respective vane pairs in selected areas in the discharge slot 21.

In operation, the starting motor 38 rotates the rotor 26 to a desirable speed within the pressure ring duct 40 to permit proper starting of the ram-jet engines 41. Upon starting the ram-jet engines 41 cause the centrifugal compressor blower blades 28 to rotate within the radial passageway 25 drawing air into the annular intake slot 23 and forcing same into the pressure ring duct 40. A relatively high pressure is maintained in the pressure ring duct 40 for increasing the efficiency of the ram-jet engines 41 and the exhaust of the ram-jet engines 41 adds to the pressure contained in said ring duct. Air and ram-jet gases discharge in a high velocity stream through the discharge slot 21 past the vanes 46, the reaction of said discharge stream causing the aircraft to rise and subsequently hover or proceed in a lateral direction as desired and dictated by the vanes 46. When traveling forward the discharge stream is in the form of an interrupted conical shape. A suitable preferably retractable landing gear 58 is provided upon which the aircraft may land and remain supported on the ground. It is noted that the rotating mass of the rotor 26 provides a gyroscopic effect for stabilizing the aircraft in flight. It is further noted that separate thrust means (not shown) may be provided for increasing forward thrust of the aircraft if desired.

Referring to FIG. 8, an additional embodiment of this invention is provided wherein the centrifugal blower rotor 59 is driven by suitable engines 60, here illustrated as an in-line reciprocating piston type, but which may be of the radial piston type or the turbine type without departing from the scope of this invention, and which drive through suitable fluid couplings 61, bevel gear sets 62, drive shaft 63 and rotor spokes 64. Suitable freely rotating bearing rollers 65 and 66 support the rotor 59 against unwanted vertical displacement without substantially interfering with the rotation thereof.

Referring to FIGS. 9 and 10 there is illustrated a still further embodiment of this invention wherein the rotor 67 is not connected to a central shaft but merely forms a ring which rotates upon suitable bearing rollers 68 and 69. The embodiment of FIGS. 9 and 10 uses ram-jet engines 70 in the manner of the embodiment of FIG. 1, however, since there is no central shaft or spokes for supporting rotating fuel lines a special fuel feeding assembly 71 is provided. The fuel feeding assembly 71 comprises an annular container 72 having upwardly extending inner lips 73 which are spaced apart but adapted to hold fuel during periods of rotation and non-rotation. The annular container 72 is fixed to and rotates with the rotor 67. A fuel discharge line 74 is stationary with respect to the aircraft and has an open end 75 which passes the lips 73 and terminates within the annular container 72. Fuel is fed from a fuel line 76 through a valve 77 which is controlled by a means of a float 78 mounted on a pivotal arm 79. As the container 72 fills with fuel 80 the float 78 is moved radially inwardly of the aircraft and shuts off flow through the valve 77. The centrifugal force produced on the fuel 80 by the rotation of the rotor 67 dictates that the fuel surface level be measured radially of the aircraft rather than vertically as would normally be expected. The fuel 80 discharges into individual ram-jet engine fuel lines 81 and passes through respective electrically controlled valves 82 into the respective engines 70. Suitable slip rings 83 and brushes 84 engaged therewith carry ignition and control signals to the ram-jet engines 70 and valves 82 through control wires 85. The embodiment of FIG. 9 is started by means of a suitable starting motor 86 which turns the rotor 67 a speed sufficient to operate the ram-jet engines 70.

It is to be understood that although certain forms of this invention have been illustrated and described they are not to be limited to the specific form or arrangement of parts herein described and shown except insofar as such limitations are included in the claims.

What I claim and desire to secure by Letters Patent is:

1. A heavier-than-air aircraft comprising:
   (a) a disk-like structure substantially symmetrical about a vertical axis and having an upper surface and lower surface and an outer peripheral edge,
   (b) said upper and lower surface being of airfoil shape and adapted to provide a lifting component in lateral flight,
   (c) a lower stator construction and an upper stator construction fixed to said lower stator construction and spaced generally upwardly therefrom forming an annular discharge slot therebetween near said outer peripheral edge, said discharge slot interrupting said lower surface for ejecting gases downwardly and conically outwardly from said structure at high velocity, said upper stator construction forming an annular intake slot at said upper surface,
   (d) a radial passageway formed between said upper and lower stator constructions and communicating between said intake and exhaust slots, a centrifugal blower rotor rotatably mounted in said structure and having circumferentially spaced blades operatively contained and rotatable in said radial passageway for directing air from said intake slot toward said discharge slot, a pressure ring duct formed in said radial passageway between said blades and said discharge slot, a plurality of jet engines mounted on said blower rotor and within said pressure ring duct for rotating said blower rotor, means for fueling said jet engines, and
   (e) control means in said discharge slot for selectively controlling flow therethrough.

2. The aircraft of claim 1 wherein said control means comprise:
   (a) a plurality of circumferentially spaced radially extending vanes extending between said upper and lower stator constructions in said discharge slot,
   (b) selected vanes being selectably tiltable for controlling torque reaction, aircraft rotation, aircraft tilt and bank, and aircraft forward motion.

3. The aircraft of claim 1 wherein said control means comprise:
   (a) a plurality of circumferentially spaced radially extending vanes mounted between said upper and lower stator constructions in said discharge slot, said vanes forming three vane sets,
   (b) said first set of vanes being parallel to each other and fixed at an angle with respect to said discharge slot for deflecting discharged gas in a direction to produce torque equal and opposite to the net torque transferred between said rotor and said structure,
   (c) said second set of vanes being parallel and variable in angle with respect to said discharge slot for in-flight turning of said aircraft on the vertical axis thereof,
   (d) said third set of said vanes being located in adjacent pairs controllable for slanting in equal and opposite direction to each other to selectively restrict gas flow therepast without introducing a torque reaction on said aircraft about a vertical axis, said third set of vanes being operable to bank and tilt said aircraft and restrict flow from said discharge slot to produce a desired lateral component for inducing airflow and lift on said airfoil.

4. A heavier-than-air aircraft comprising:
   (a) a disk-like structure substantially symmetrical about a vertical axis and having an upper surface and lower surface and an outer peripheral edge,
   (b) said upper and lower surface being substantially convex in shape presenting a bi-convex airfoil adapted to provide a lifting component in lateral flight,
   (c) conical walls forming a passenger and control compartment located centrally of said structure and protruding upwardly from the center thereof,
   (d) a lower stator construction supporting said compartment walls, an upper stator construction fixed to said lower stator construction and spaced generally upwardly and radially outwardly therefrom forming an annular discharge slot therebetween near said outer peripheral edge, said discharge slot interrupting said lower surface for ejecting gases downwardly and conically outwardly from said structure at high velocity,
   (e) said upper stator construction being spaced radially outwardly from said compartment walls forming an annular intake slot therebetween at said upper surface and surrounding said compartment,
   (f) a radial passageway formed between said upper and lower stator constructions and communicating between said intake and exhaust slot, a centrifugal blower rotor rotatably mounted between said stator constructions and having circumferentially spaced blades operatively contained and rotatable in said radial passageway for directing air from said intake slot toward said discharge slot,
   (g) a pressure ring duct formed in said passageway between said blades and said discharge slot, a plurality of balanced ram-jet engines mounted on said rotor and spaced outwardly thereof within said pressure ring duct, and means for fueling said ram-jet engines for rotating said rotor.

5. The aircraft of claim 2 wherein said vanes are mounted on supporting shafts respectively engaging said upper and lower stator constructions.

6. The aircraft of claim 1 wherein said centrifugal blower rotor is center shaftless.

References Cited in the file of this patent

UNITED STATES PATENTS

| | | |
|---|---|---|
| 2,718,364 | Crabtree | Sept. 20, 1955 |
| 2,807,428 | Wibault | Sept. 24, 1957 |